United States Patent
Taghizadeh-Kaschani

(10) Patent No.: US 6,909,268 B2
(45) Date of Patent: Jun. 21, 2005

(54) CURRENT-MODE SWITCHING REGULATOR

(75) Inventor: Karim-Thomas Taghizadeh-Kaschani, Poing (DE)

(73) Assignee: Infineon Technologies AG, Munich (DE)

(*) Notice: Subject to any disclaimer, the term of this patent is extended or adjusted under 35 U.S.C. 154(b) by 246 days.

(21) Appl. No.: 10/378,792

(22) Filed: Mar. 4, 2003

(65) Prior Publication Data

US 2004/0012376 A1 Jan. 22, 2004

Related U.S. Application Data

(63) Continuation of application No. PCT/EP01/09763, filed on Aug. 23, 2001.

(30) Foreign Application Priority Data

Sep. 4, 2002 (DE) .......................... 100 43 482

(51) Int. Cl.[7] .............................. G05F 1/44; G05F 1/56
(52) U.S. Cl. ..................... 323/284; 323/285; 323/290
(58) Field of Search ............................. 323/284, 285, 323/290, 222, 282

(56) References Cited

U.S. PATENT DOCUMENTS

| | | | |
|---|---|---|---|
| 5,847,554 A | * 12/1998 | Wilcox et al. | 323/282 |
| 5,912,552 A | * 6/1999 | Tateishi | 323/285 |
| 5,982,160 A | 11/1999 | Walters et al. | 323/282 |
| 6,064,187 A | * 5/2000 | Redl et al. | 323/285 |
| 6,127,815 A | * 10/2000 | Wilcox | 323/282 |
| 6,130,575 A | * 10/2000 | Nelson et al. | 327/540 |
| 6,215,290 B1 | * 4/2001 | Yang et al. | 323/282 |
| 6,222,356 B1 | * 4/2001 | Taghizadeh-Kaschani | 323/288 |
| 6,518,738 B1 | * 2/2003 | Wang | 323/284 |

FOREIGN PATENT DOCUMENTS

| | | |
|---|---|---|
| DE | 198 14 681 A1 | 10/1999 |
| EP | 0 734 009 A2 | 9/1996 |
| JP | 2000-139073 | 5/2000 |

OTHER PUBLICATIONS

Kleine, G.: "DC/DC–Wandler +1,5 V auf +34 V" [DC/DC Converter from +1.5 V to +34 V], Halbleiterheft, Elektro 7–8, 2000, p. 98.

* cited by examiner

Primary Examiner—Bao Q. Vu
(74) Attorney, Agent, or Firm—Laurence A. Greenberg; Werner H. Stemer; Gregory L. Mayback

(57) ABSTRACT

A current mode switching controller contains at least one controllable semiconductor switch, an impedance, a voltage divider, an external control circuit for regulating the voltage, and an internal control circuit coupled to the external control circuit and used to regulate the load current. The circuits controlling the controllable semiconductor switch according to the load current and the output potential. An integrator is provided for producing a control signal representing the load current as a result of time integration of the voltage. A signal is supplied to the internal control circuit as a control variable. Means for adapting the amplitude of the integrator contains at least one transconductance whose value in a transient state is inversely proportional to the output potential.

15 Claims, 4 Drawing Sheets

CURRENT-MODE SWITCHING REGULATOR

CROSS-REFERENCE TO RELATED APPLICATION

The application is a continuation of copending International Application No. PCT/EP01/09763, filed Aug. 23, 2001, which designated the United States and was not published in English.

BACKGROUND OF THE INVENTION

Field of the Invention

The invention relates to a current-mode switching regulator, in particular for pulsed power supplies and/or switched-mode power supplies.

Switching regulators can be used in a multiplicity of different application possibilities, such as e.g. in pulsed power supplies and switched-mode power supplies. In the case of a pulsed power supply, an input voltage—for example a rectified mains voltage—is converted into an essentially rectified, pulsed DC voltage with a variable duty ratio by a pulse width modulator and a power switch connected downstream thereof. The task of the switching regulator is to keep the voltage at the output of a filter of the power supply constant over the widest possible output current range. Furthermore, the switching regulator must be configured to detect the output current and the output voltage of the filter and to generate therefrom a control signal for driving the power switch.

Essentially three different control strategies exist for the control of such switching regulators: voltage mode control, feedforward control and current mode control. The control strategies are described for example in the reference by R. E. Tarter, titled "Solid-State Power Conversion Handbook", Wiley Interscience, New York, 1993.

Current mode control constitutes a particularly elegant and effective type of control which, moreover, requires only comparatively small compensation capacities and is thus ideal for use in integrated switching regulators.

Current-mode switching regulators have an inner control loop for controlling the load current and an outer control loop which, together with the inner control loop, serves for controlling the output voltage. With the switch switched on, the current rising in ramped fashion through an inductor coil of the switching regulator causes the voltage across a measuring resistor likewise to have a ramped shape. When a desired voltage prescribed by the outer control loop is reached, the switch switches off.

In most voltage regulators, for example in linear regulators or switching regulators, it is often desired to increase the output voltage of the regulator e.g. by devices or components that can be provided externally, in order thereby to ensure a more flexible area of use for the voltage regulator. In the case of voltage regulators configured as linear regulators, this can be achieved very simply by connecting a voltage divider upstream of the input with which the linear regulator monitors the amplitude of the output voltage. Such a control strategy is also referred to as a feedback divider.

Such a measure is also possible, in principle, in switching regulators. However, in switching regulators which are operated according to so-called current-mode control, care must be taken to ensure that the additional ramp added to the current ramp in order to avoid subharmonic oscillations, for the so-called slope compensation, is adapted to an altered output voltage. In this case, however, it must be taken into account that, on the one hand, the amplitude of the load current ramp increases when the output voltage increases, but it must always remain significantly smaller than the supply voltage of the circuit blocks involved, since otherwise the advantages of current-mode control disappear. On the other hand, the amplitude of the current ramp must also not become too small, in order to ensure interference immunity with respect to interference signals.

SUMMARY OF THE INVENTION

It is accordingly an object of the invention to provide a current-mode switching regulator which overcomes the above-mentioned disadvantages of the prior art devices of this general type, which has a control characteristic that is independent of the respective output voltage to the greatest possible extent.

With the foregoing and other objects in view there is provided, in accordance with the invention, a current-mode switching regulator. The current-mode switching regulator contains a first terminal having a first supply potential, a second terminal having a second supply potential, at least one controllable semiconductor switch having a load path disposed between the first terminal and the second terminal, an impedance connected to the load path, and a voltage divider connected in series with the impedance at a tap. At the tap an output potential can be tapped off. An outer control loop is provided for voltage regulation. An inner control loop is provided for load current regulation. The inner control loop is coupled to the outer control loop and drives the controllable semiconductor switch according to a load current and the output potential. An integrator is coupled to the impedance and receives a voltage dropped across the impedance. The integrator integrates the voltage with respect to time resulting in a control signal mapping the load current, the control signal fed as a controlled variable to the inner control loop. Means for adapting a gain of the integrator is provided and has at least one transconductance whose value in a settled state is inversely proportional to the output potential.

In the settled state, that is to say with a constant output voltage, the integrator must have a highly linear characteristic curve since the capacitor which is typically concomitantly integrated in the integrator is an image of the impedance formed as an inductor coil. The voltage across the capacitor then maps the load current through the inductor coil by integration. According to the invention, in this case a voltage-controlled transconductance is additionally provided in the integrator, which in each case provides a constant voltage at its output for arbitrarily prescribed, but constant voltages at its input, the input voltage of the integrator in this case being equal to the output voltage of the switching regulator which is fed back as a control signal. According to the invention, this can be achieved by suitable adaptation of the gain of the integrator by the integrator having a transconductance that is inversely proportional to the output voltage of the voltage regulator.

The impedance ideally exclusively contains an inductor coil. When using an impedance configured exclusively as an inductor, a measuring resistor for detecting the measurement voltage, as is usually necessary, can advantageously be dispensed with. The measurement voltage required for regulating the load current is tapped off at the inductor inductance itself that is necessary anyway for the functioning of the switching regulator. The relationship between current I and voltage U at an inductance L is utilized here, i.e. $U = L \, dI/dt$. The inductor voltage U is subsequently fed to an integrator, e.g. a voltage-controlled current source with an integrating element connected downstream, so that the voltage dropped across the inductor inductance is integrated over time. In this way, an additional measuring resistor, typically formed externally, with all the disadvantages described above is not necessary.

Since a coil typically has a resistive component as well, it would also be conceivable, as an alternative, for the impedance to contain a series circuit having an inductor coil and a resistance element. In this case, the resistance element would be a parasitic resistance and/or a nonreactive resistance connected in series with the inductor.

In order to increase the input voltage range of the voltage regulator, a voltage divider is provided, which is disposed in series with the load path of the controllable semiconductor switch and the inductor device. The voltage divider potential can be tapped off at the center tap of the voltage divider. The voltage divider is dimensioned in such a way that the voltage divider ratio is inversely proportional to the output potential of the switching regulator. The voltage divider ratio results from the voltage dropped across the base point resistor divided by the voltage dropped across both resistors.

The voltage divider is typically formed externally in order that the desired output voltage can be varied, depending on the requirement, for example by exchanging or varying the resistors of the voltage divider. In this way, the control behavior remains independent of the choice of the output voltage even when the components of the voltage divider are varied.

In a highly advantageous refinement of the invention, the means for adapting the gain of the integrator are concomitantly integrated in the integrator itself. Since the functionality of the integrator results in that the latter has to detect the output voltage anyway for current regulation purposes, an additional terminal pin is not required for this functionality.

For the realization of the integrator with concomitantly integrated means for adapting the gain, what is suitable in a particularly advantageous manner is a multiplier or divider in the form of an extended Gilbert cell, since, in addition to forming the difference between the two input signals, of which one is the output potential and the other is the inductor potential, it is also necessary to perform a temperature compensation. By the Gilbert cell, a temperature compensation is advantageously made available at the same time.

Since the input currents are detected by resistors of the voltage divider, the temperature coefficient of the resistors must be compensated for by a reference current with the same temperature coefficient. By the integrator according to the invention with a concomitantly integrated Gilbert cell, the reference current is modulated by the output potential of the switching regulator, the output potential being present at the negative input, in such a way that the reference current is directly proportional to the corresponding voltage conductor resistance multiplied by the output potential, thereby resulting in the desired temperature dependence of the transconductance.

In a typical refinement of the invention, the outer control loop of the current-mode switching regulator has a first control circuit, to which the potential at the center tap of the voltage divider is fed as a controlled variable. A reference potential is typically coupled into the respective other input of the first control circuit. The inner control loop likewise has a control circuit into which are fed, on the one hand, a controlled variable, the control signal of the integrator and, on the other hand, the output signal of the first control circuit. On the output side, the second control circuit in turn generates a control signal, which serves for driving the semiconductor switch.

In a typical refinement, the integrator is configured as a voltage-controlled current source. In this case, a transconductance amplifier and/or an operational amplifier with a capacitive element connected downstream may be provided as the integrator.

In a typical refinement, the second control circuit has a pulse width modulator which provides pulsed drive signals at its output for driving the switching transistor and, for this purpose, has at least one pulse-width-modulated comparator and a clocked storage device.

In an advantageous development of the invention, a compensation device is provided, which, in the event of a control deviation of the first control circuit, generates a compensation signal derived from the control deviation. The compensation signal is superposed on the control signal derived from the load current and is coupled into the inner control circuit as a controlled variable. The output variable of the compensation device is typically limited.

The control of the compensation device is affected sluggishly. The inertia may advantageously be set by the integrating element of the integrator.

In a particularly advantageous refinement, the controllable semiconductor switch is configured as a MOSFET, in particular as a depletion-mode MOSFET. By way of example, a power MOSFET, in particular a depletion-mode power MOSFET, a bipolar transistor, a triac, an IGBT, a thyristor or the like may be used as the controllable semiconductor switch. As an alternative, a relay for switching the power would also be conceivable.

In an advantageous refinement of the invention, virtually the entire current-mode switching regulator is integrated on a single semiconductor chip, so that only the voltage divider is formed externally and connected up to the current-mode switching regulator via a terminal.

The preferred, but not necessarily exclusive application of the current-mode switching regulators according to the invention is in pulsed power supplies. The invention is particularly advantageous in a switched-mode power supply having a current-mode switching regulator.

Although the current-mode switching regulator according to the invention is configured as a buck converter in the description of the figures below, the invention is not restricted to a buck converter, but rather can advantageously be used in any current-mode switching regulator, such as, for example, in a boost converter, flyback converter, or converters derived therefrom.

Other features which are considered as characteristic for the invention are set forth in the appended claims.

Although the invention is illustrated and described herein as embodied in a current-mode switching regulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
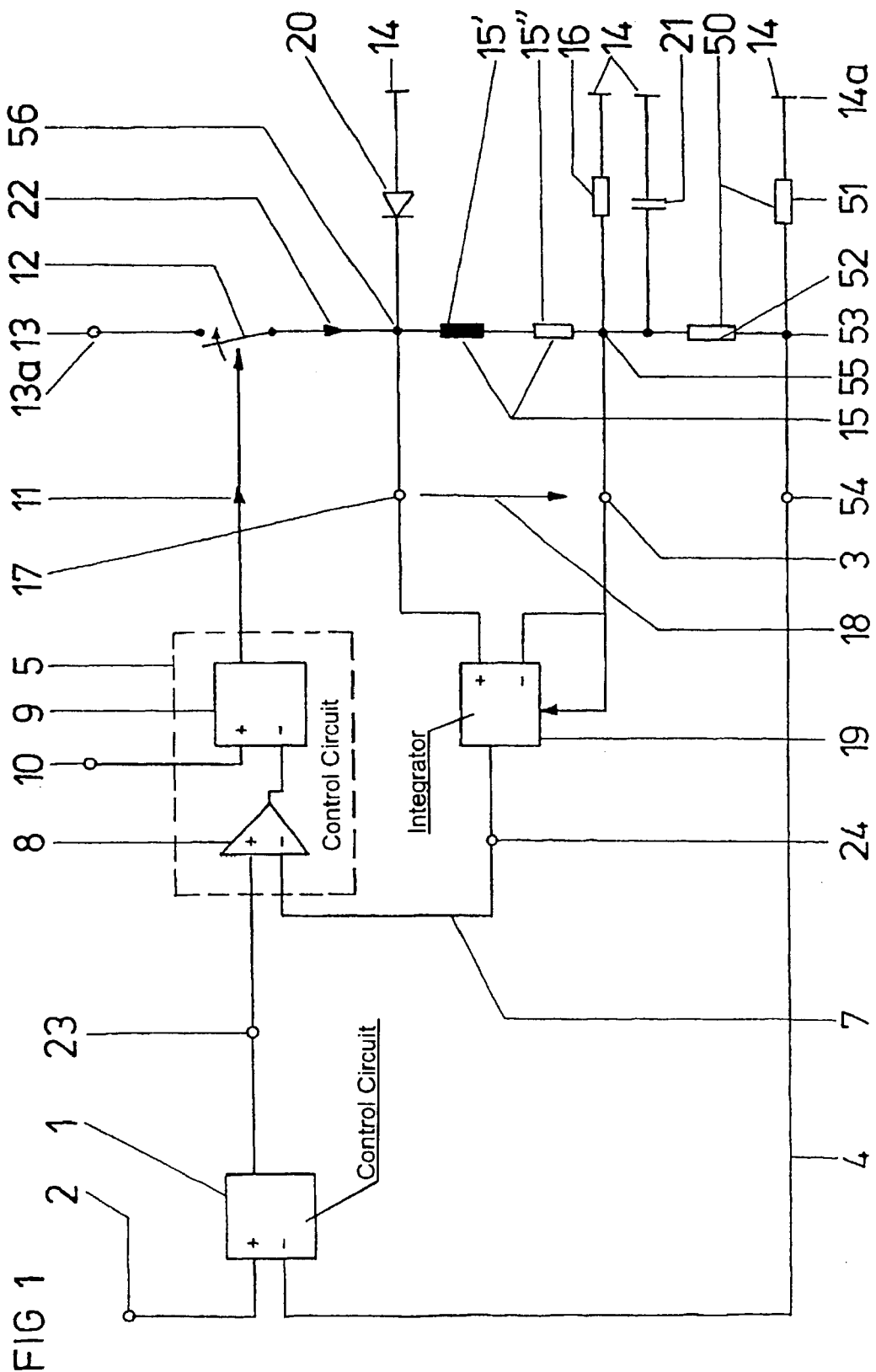
FIG. 1 is a block circuit diagram of a current-mode switching regulator according to the invention.

In all the figures of the drawing, sub-features and integral parts that correspond to one another bear the same reference symbol in each case. Referring now to the figures of the drawing in detail and first, particularly, to FIG. 1 thereof, there is shown a general block diagram of a current-mode switching regulator according to the invention, for example for use in a switched-mode power supply.

The current-mode switching regulator in FIG. 1 contains a first control circuit 1. The first control circuit 1 has two control inputs and an output. In the present exemplary embodiment, a reference potential 2 is fed to the positive input of the first control circuit 1. A voltage divider potential 54 of the switching regulator is coupled as a controlled variable into a negative input of the first control circuit 1 via a feedback path 4. A desired potential 23 can be tapped off at the output of the first control circuit 1 and is fed to a second control circuit 5 connected downstream.

The second control device 5 is a device for pulse width modulation (PWM). The PWM device 5 contains a PWM comparator 8, into whose positive input the desired potential 23 is coupled and into whose negative input a control signal 24 is coupled via a feedback path 7. An output signal of the PWM comparator 8 is fed together with a system clock 10 to a storage device connected downstream, e.g. a latch 9. A pulse-width-modulated drive signal 11 can then be tapped off at an output of the latch 9, a control terminal of a switch 12 connected downstream being driven by the drive signal. In this case, the switch 12 is configured as a load current switch for switching large loads.

The load current switch 12 is connected between a first terminal 13a with a first supply potential 13 and a second terminal 14a with a second supply potential 14. In this case, the first supply potential 13 may be a positive supply potential, while the second supply potential 14 may be the potential of a reference-ground potential.

Connected in series with the load current path of the power switch 12 are an impedance 15 and a load 16, which need not necessarily be resistive. In FIG. 1, the impedance 15 contains an inductor inductance 15' and a resistive element 15" connected in series therewith. The inductor inductance 15' is typically configured as a coil, while the resistive element 15" is configured as a real non-reactive resistance and/or as a parasitic resistance that is typically inherent to every coil. An output potential 3 of the current-mode switching regulator can be tapped off at a tap 55 between the impedance 15 and the load 16. A measurement potential 17 can be tapped off at a tap 56 between the impedance 15 and the power switch 12.

A voltage 18 dropped across the impedance 15 is fed to an integrator 19, i.e. a voltage-controlled current source. In this case, the measurement potential 17 is fed to the positive input and the output potential 3 is fed to the negative input of the integrator 19. The integrator 19 generates the control signal 24 that, as mentioned above, is fed as a controlled variable to the PWM device 5 via the feedback path 7.

In addition, a freewheeling element 20 is provided in FIG. 1. In this case, the freewheeling element 20 is provided as a freewheeling diode 20 and is disposed between the tap 56 and reference ground terminal 14. Furthermore, FIG. 1 shows an element for voltage smoothing 21 and also a voltage divider 50. In this case, the element for voltage smoothing 21 is configured as a smoothing capacitor 21. The smoothing capacitor 21 and also the voltage divider 50 are connected in parallel with one another and with the load 16. The voltage divider 50 contains two resistors 51, 52, at whose center tap 53 the voltage divider potential 54 can be tapped off. The voltage divider potential 54 can then be passed—as mentioned above—to the first control circuit 1 via the feedback path 4.

The controllable power switch 12 may be formed by any type of field-effect-controlled transistor, bipolar transistor or similar controllable switches. All that is essential in this case is that the controllable power switch 12 is suitable for switching a (pulsed) load current 22 in the load circuit of the switching regulator.

In the present exemplary embodiment, the impedance 15 is connected between the load 16 and the power switch 12. However, the inductor coil 15 could also be connected between the power switch 12 and the first terminal 13a. The inductor inductance 15' may be formed as a coil, as part of a transformer or a similar inductive element. All that is essential in this case is that the inductor inductance 15' is disposed in the load circuit of the switching regulator.

The smoothing capacitor 21 and the inductor inductance 15' serve for smoothing the output potential 3 and the load current 22, respectively, of the current-mode switching regulator. The freewheeling element 20 serves to protect the power switch 12 from being destroyed when the reverse voltage thereof is exceeded.

The first control circuit 1 is part of an outer control loop, while the second control circuit 5 is part of the inner control loop. In this case, the first control circuit 1 serves to regulate the output potential 3 of the switching regulator, while the second control circuit 5 is provided for regulating the load current 22.

The second control circuit 5 does not necessarily have a PWM device in accordance with FIG. 1. All that is essential in this case is that the second control circuit 5 contains a device for regulating the load current 22.

In the circuit configuration in accordance with FIG. 1, unlike what has been customary hitherto, the measurement voltage is not tapped off at a resistive measuring element, for example a measuring resistor, and fed back as a controlled variable of the inner control loop. Rather, in this case the voltage is tapped off at the inductor inductance 15' that is present anyway and is absolutely necessary. The inductor voltage 18 is then fed to the integrator 19. In this way, the load current 22 is determined by measurement of the voltage drop 18 across the inductor inductance 15' and integration with respect to time. The control signal 24 derived from the load current 22 can then be tapped off at the output of the integrator 19, which control signal can be fed as a controlled variable of the inner control loop to the PWM device.

According to the invention, then, by adapting the gain of the integrator 19, the intention is to achieve the situation where the control characteristic is independent of the output voltage respectively chosen. In order to adapt the gain of the integrator 19, the latter has a transconductance $G_{19}$ which is proportional to the reciprocal of the output potential $V_{55}$, that is to say:

$$G_{19} \propto \frac{1}{V_{55}} \quad (1)$$

Since the integrator 19 has to detect the output potential 55 or the inductor voltage 18 anyway, no additional terminal pin is necessary for this. The dimensioning of the voltage divider 50, which is typically formed externally, leads to the following divider ratio $$\frac{V_{53}}{V_{55}} = \frac{R_{51}}{R_{51} + R_{52}} \propto \frac{1}{V_{55}}, \quad (2)$$

where $V_{53}$, $V_{55}$ designate the corresponding potentials 53, 55 and $R_{51}$, $R_{52}$ designate the resistances 51, 52 of the voltage divider 50. Consequently, a division ratio of the voltage divider 50 is thus also inversely proportional to the output potential 55.

The use of a multiplier or divider for example in the form of a Gilbert cell is appropriate for the realization of the integrator 19. The output current $I_{24}$ of the multiplier is then $$I_{24} = C_{19} \frac{dV_{19}}{dt}, \quad (3)$$

where $C_{19}$ designates the capacitance of the integrator 19, in particular of a capacitor 34, and $V_{19}$ is the voltage dropped across the capacitance. The relationship $$I_{24} = G_{19} L_{15} \frac{dI_{22}}{dt} \quad (4)$$

then leads to $$V_{19} = \text{const} I_{22} \propto I_{22} \quad (5).$$

In this case, $G_{19}$ designates the transconductance of the integrator, $I_{22}$ designates the load current 22 and $L_{15}$ designates the inductor inductance 15. Consequently, by choosing the transonductance suitably, the output potential of the integrator 19 depends only on the load current 22.

Figure 2:
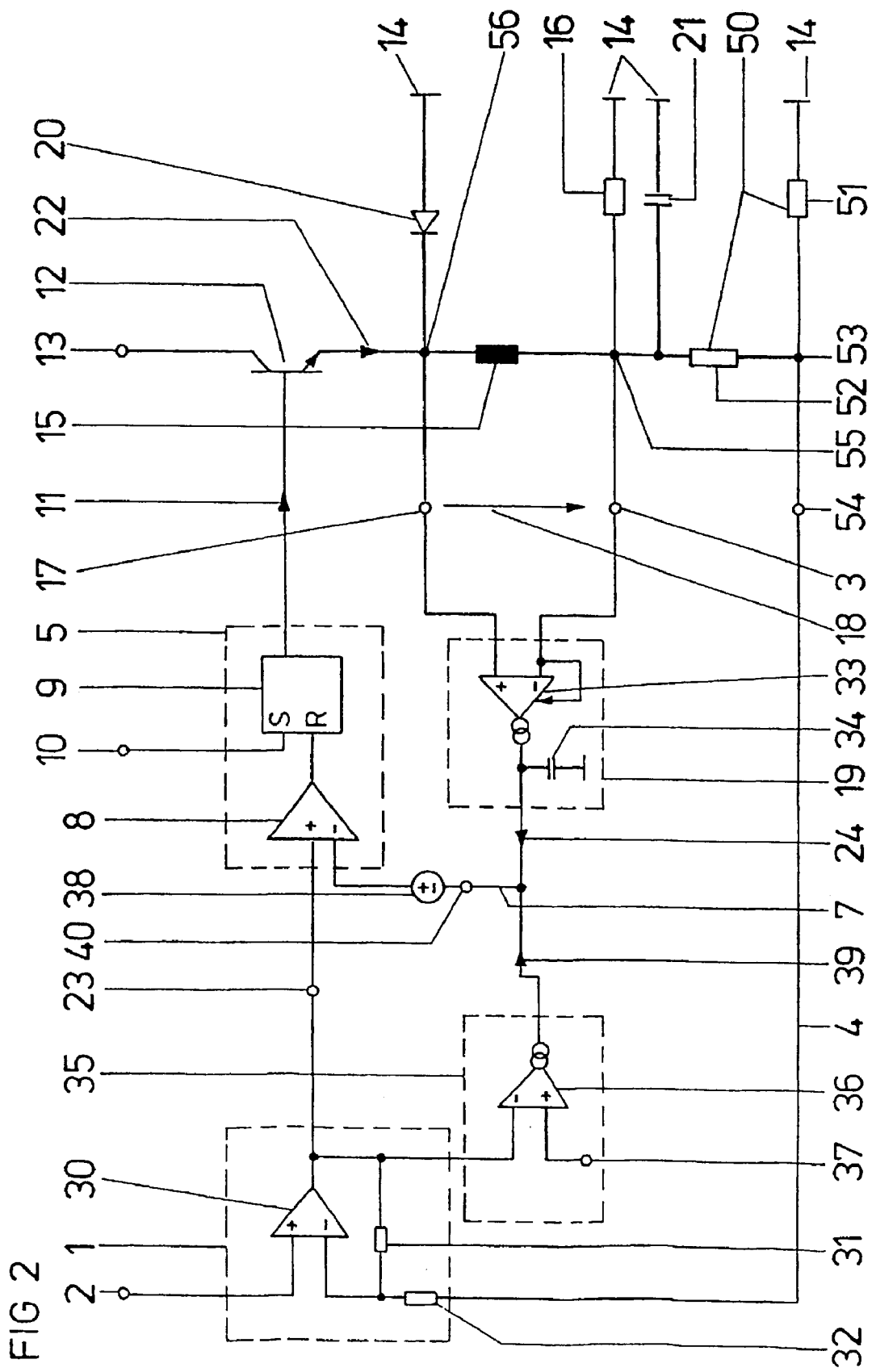
FIG. 2 is a block circuit diagram of a second exemplary embodiment of the current-mode switching regulator according to the invention.

The precise method of operation of the current-mode switching regulator according to the invention is explained in more detail below with reference to a detail circuit diagram in accordance with FIG. 2. FIG. 2 specifies a preferred exemplary embodiment of the circuit configuration according to the invention from FIG. 1, which additionally has a device for compensating for a control deviation of the outer control loop.

In FIG. 2, the first control circuit 1 is configured as an amplifier whose gain is as a rule frequency-dependent. The first control circuit 1 contains a comparator 30, between whose output and negative input a first resistor 31 is connected. A second resistor 32 is connected in series upstream of the parallel circuit containing the comparator 30 and the resistor 31. Consequently, as is known, a gain factor of the amplifier and thus of the first control circuit 1 can be dimensioned by way of the ratio of the resistances of the first resistor 31 and the second resistor 32.

In FIG. 2, the PWM device 5 is realized by a PWM comparator 8 and an RS flip-flop 9 connected downstream of the PWM comparator 8. In this case, the output signal of the PWM comparator 8 is coupled into a reset input R and the system clock 10 is coupled into the set input S of the RS flip-flop 9. The pulse-width-modulated drive signal 11 that can be tapped off at the output of the RS flip-flop 9 is fed to the control terminal of the power switch 12 connected downstream. The power switch 12 is realized as an npn bipolar transistor in this case. The latch configured as the RS flip-flop 9 serves to ensure that in each case only one pulse per clock period is fed to the control terminal of the power switch 12, downstream. Consequently, on average a constant load current flows in the settled state.

In FIG. 2, the integrator 19 controlled by the inductor voltage 18 is formed as a transconductance amplifier 33 with the integrating element 34 connected downstream. A capacitor is connected as the integrating element 34 between the output of the transconductance amplifier 33 and the second terminal of the supply voltage source. It would also be conceivable, of course, to use an operational amplifier as the integrator 19, but this possibility would be very much more complicated in terms of circuitry.

The transconductance amplifier 33 generates from the measurement voltage across the inductor inductance 15, i.e. from the difference between the measurement potential 17 and the output potential 3, an output current that is integrated over time by the integrating element 34. The integrated output current 24 then forms the load current 22. Via the feedback path 7, a resulting control potential 40 is then fed back via a voltage source 38, which serves for realizing the so-called "slope compensation" required, as a controlled variable of the inner control loop. The inertia of the inner control loop or of the second control circuit 5 can be dimensioned by way of the capacitor 34. The "slope compensation" ensures a stable duty ratio above 50% in the case of a current-mode switching regulator. In order to ensure stability, it is to be superposed on the control signal 40—added to the second control circuit 5—with a voltage ramp. As a result of this, the duty ratio can be kept stable even at values above 50%.

A particularly simple realization of the "slope compensation" includes a non-illustrated current source controlled by the system clock, which current source feeds a pulsed current into the integrating element 34. Given a suitable amplitude of the current pulses, the voltage ramp required for slope compensation is produced on account of the integrating action of the integrating element. The advantage over a conventional realization is that the outlay on circuitry remains much lower.

In addition, in FIG. 2, a so-called "feed forward control circuit" is provided for compensating for a control deviation of the desired voltage of the outer control loop. To that end, a compensation device 35 is provided, which contains a second transconductance amplifier 36 and a non-illustrated capacitor. The desired potential 23 of the first controller device 1 is fed to a negative input of the transconductance amplifier 36. A second desired potential 37 of a desired value voltage source is fed to the positive input of the transconductance amplifier 36. A compensation signal 39 can then be tapped off at the output of the compensation device 35, which compensation signal, via the feedback path 7 together with the output current 24, generates the control potential 40 and is coupled into the control input of the PWM device 5.

The method of operation of the compensation device 35 is explained in more detail below.

As explained above, the gain factor of the comparator 30 and thus of the first control circuit 1 results from the ratio of the resistances of the resistors 31 and 32. However, if the comparator 30 has an excessively small gain, then a control deviation can arise in the output signal of the first control circuit 1, i.e. a deviation arises between the desired potential 23 generated by the first control circuit 1 on the output side and a predetermined desired potential 37.

Increasing the gain factor of the comparator 30 through suitable dimensioning of the resistors 31, 32 is only possible to a limited extent, however, since, in the case of an excessively large gain, the outer control loop is not stable and starts to oscillate. By way of example, in the case of a gain factor V=10, a control deviation between the desired potential 23 of the first controller device 1 and the predetermined desired potential 37 of about 10% is produced.

In order to compensate for the control deviation, the desired potential 23 of the first control circuit 1 is fed to the compensation device 35. In the event of a control deviation a compensation signal 39 is generated at the output of the compensation device 35. The DC voltage signal 39 is superposed on the AC voltage signal 24 provided by the voltage-controlled current source 19 on the output side. An AC-voltage-superposed DC voltage signal 40 is then fed into the PWM device as controlled variable. Consequently, in the event of a control deviation of the desired potential 23, a DC component corresponding to the control deviation is coupled into the negative input of the PWM device for the purpose of compensation. What is achieved in this way is that the output voltage of the outer controller and thus also the input voltage thereof are at a fixed potential, that is to say the predetermined desired value level of the desired potential. This prevents a control deviation from being maintained in the output signal of the outer control loop and thus adversely affecting the stability of the control system.

In the event of small control deviations, it is not necessary, and often not desirable either, to correct them immediately, i.e. dynamically without a delay. Therefore, provision is typically made of an element that determines the inertia of the compensation device, which element is typically formed by a capacitor. In FIG. 2, the capacitor is advantageously formed by the capacitor 34 of the voltage-controlled current source 19. A capacitor can be saved in this way.

The compensation device is an integrator, as is known, and, similarly to the integrator 19, can therefore be formed by any type of voltage-controlled current source. Consequently, the voltage-current conversion of the compensation device 35 is also not necessarily restricted to a transconductance amplifier 36, but rather may also be replaced by an operational amplifier, for example.

Figure 3A:
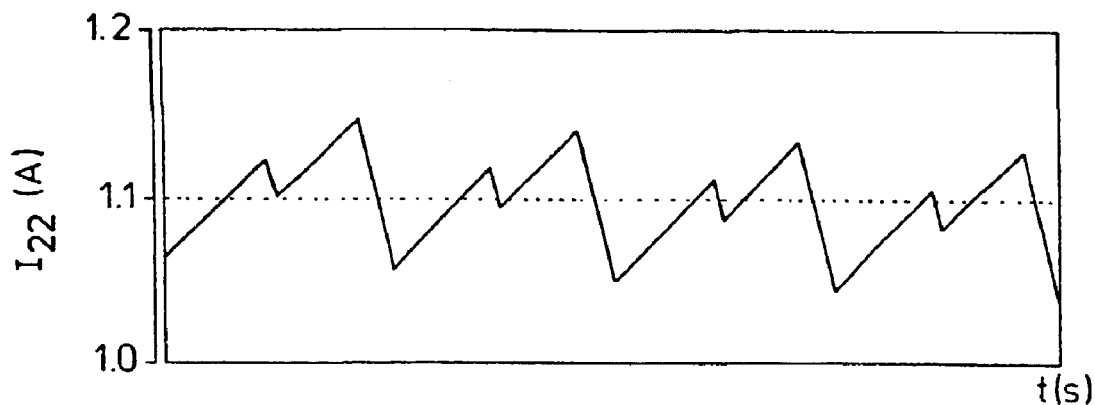
FIGS. 3A–3C are graphs showing signal/time diagrams of the switching regulator according to the invention.
Figure 3B:
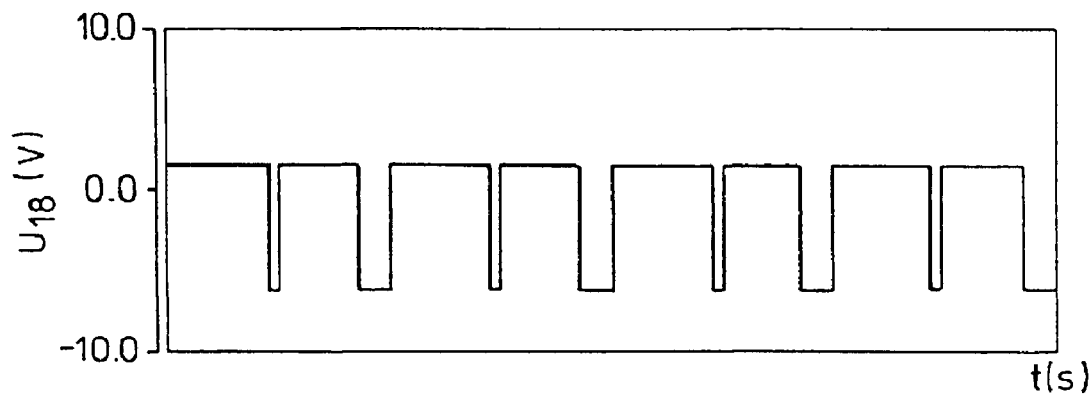
Figure 3C:
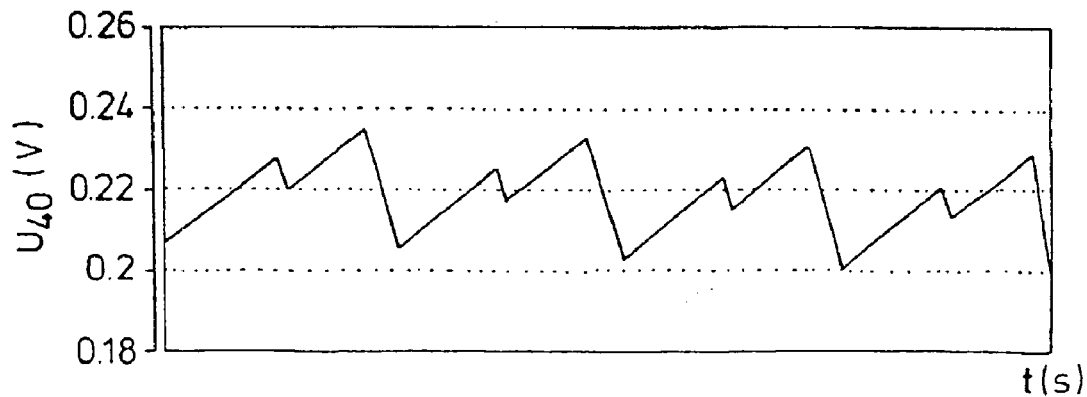

FIGS. 3A–3C shows three signal/time diagrams of the circuit configuration for a fixed predetermined output potential 55 in accordance with FIG. 1. In a simulation of the circuit configuration in accordance with FIG. 2, FIG. 3A shows the temporal profile of the load current 22, FIG. 3B shows the temporal profile of the inductor voltage 18 and FIG. 3C shows the temporal profile of the load current 22 determined by the voltage-controlled current source 19, in the case of which the DC voltage component of the control signal has been "corrupted" by the compensation signal 39 of the third control circuit.

In the settled state, the load current 22 is established in the load circuit of the switching regulator (FIG. 3A). The measured inductor voltage 18 represents the time derivative of the rectangular-waveform inductor voltage 18 that produces a control potential 40 having exactly the same waveform as the load current 22.

In the integrator 19, as is known, a signal mapping the load current 22 is to be generated, i.e. a current is to be transformed into a voltage in order then to process the latter further. Although this could be done in a simple manner by connecting a voltage source to a current mirror via a resistor, such a configuration has the disadvantage that the voltage dropped across the resistor is composed of the difference between the voltage source to be transformed and the voltage drop at the base transistor at the current mirror and, consequently, the current through the resistor reflects not only the temperature coefficient of the resistor but also that of the transistor used. If such a mirrored output current is fed in addition to correspondingly derived currents into a multiplier or divider, such as e.g. of a Gilbert cell, then the result, on account of the base-emitter voltage drop, is a nonlinear output characteristic curve, which should be avoided. Therefore, it is desirable to avoid or remove this base-emitter voltage component $V_{be}$.

Figure 4:
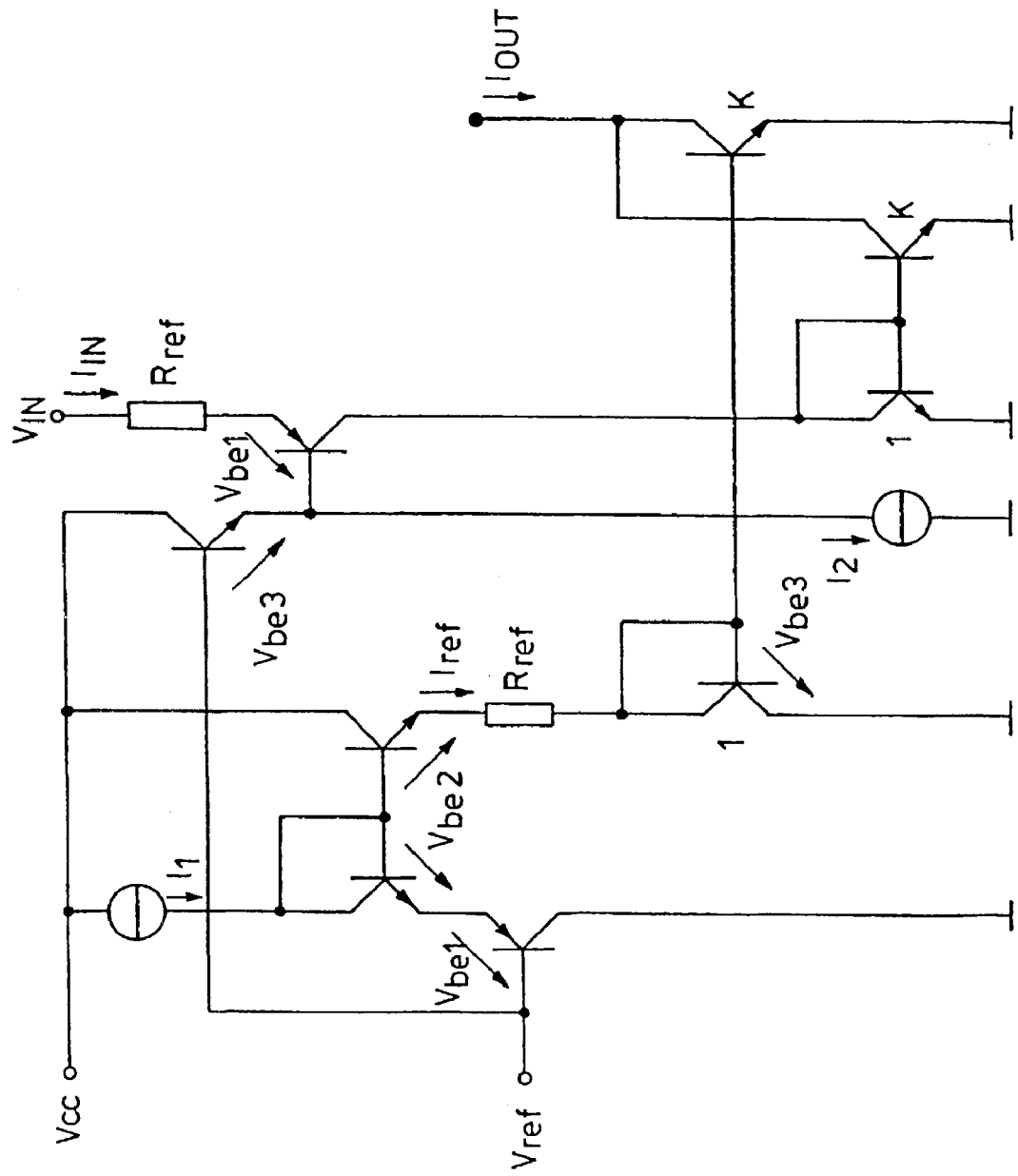
FIG. 4 is a circuit diagram for a current-mode switching regulator according to the invention in accordance with FIG. 1, illustrating a voltage-controlled current source for the integrator configured as a Gilbert cell.

FIG. 4 shows a detail circuit by which this is avoided. According to the invention, in this case a reference resistor $R_{ref}$ is connected between an input voltage $V_{IN}$ and a known auxiliary voltage $V_{ref}$. An additional reference current $I_{ref}$ is added in the current then established through the reference resistor $I_{IN}$, the reference current resulting from the voltage drop of the same auxiliary voltage $V_{ref}$ across a structurally identical reference resistor $R_{ref}$. In an advantageous refinement, the required auxiliary voltage $V_{ref}$ can be obtained from an unstabilized reference voltage $V_{ref}$ by cascading emitter and source followers.

The invention shall not be restricted exclusively to the exemplary embodiments in accordance with FIGS. 1, 2, 4. Rather, by way of example, the circuit blocks specified in FIG. 1, that is to say the inner and outer control circuits and also the integrator, can be realized in manifold ways in terms of circuitry.

To summarize, it can be stated that, by the current-mode switching regulator constructed in the manner described, through adaptation of the integrator in a simple but nonetheless effective manner, it is possible to provide a control characteristic which is largely independent of the respective output voltage.

The present invention has been set forth on the basis of the above description in such a way as to explain the principle of the invention and its practical application as well as possible. It goes without saying that the present invention can be realized in a suitable manner in manifold embodiments and modifications within the scope of expert action and knowledge.

I claim:

1. A current-mode switching regulator, comprising:
    a first terminal having a first supply potential;
    a second terminal having a second supply potential;
    at least one controllable semiconductor switch having a load path disposed between said first terminal and said second terminal;
    an impedance connected to said load path;
    a voltage divider connected in series with said impedance at a tap, at said tap an output potential can be tapped off;
    an outer control loop for voltage regulation;
    an inner control loop for load current regulation, said inner control loop coupled to said outer control loop and driving said controllable semiconductor switch according to a load current and the output potential;
    an integrator coupled to said impedance and receiving a voltage dropped across said impedance, said integrator integrating the voltage with respect to time resulting in a control signal mapping the load current, the control signal fed as a controlled variable to said inner control loop; and
    means for adapting a gain of said integrator and having at least one transconductance whose value in a settled state is inversely proportional to the output potential.

2. The switching regulator according to claim 1, wherein said impedance exclusively contains an inductor coil.

3. The switching regulator according to claim 1, wherein said impedance contains a series circuit having an inductor coil and a resistance element.

4. The switching regulator according to claim 1, wherein said voltage divider has a center tap and outputs a voltage divider potential which can be tapped off at said center tap, said voltage divider having a voltage divider ratio) inversely proportional to the output potential.

5. The switching regulator according to claim 1, wherein said means are concomitantly integrated in said integrator.

6. The switching regulator according to claim 1, wherein said means has at least one of a multiplier and a divider configured as a Gilbert cell.

7. The switching regulator according to claim 1, wherein:
said controllable semiconductor switch has a control terminal;
said outer control loop has a first control circuit receiving the voltage divider potential functioning as a controlled variable and generates a first control output signal; and
said inner control loop has a second control circuit receiving the control signal from said integrator and the first control output signal from said first control circuit as a controlled variable, said second control circuit having an output connected to and driving said control terminal of said controllable semiconductor switch.

8. The switching regulator according to claim 1, wherein said integrator is a voltage-controlled current source.

9. The switching regulator according to claim 1, wherein said integrated has at least one of a transconductance amplifier and an operational amplifier with a capacitive element connected downstream.

10. The switching regulator according to claim 7, wherein said second control circuit has a pulse width modulator containing at least one pulse-width-modulated comparator and a clocked storage device connected downstream of said pulse width modulator.

11. The switching regulator according to claim 1, wherein said controllable semiconductor switch is selected from the group consisting of MOSFETs, depletion-mode MOSFETs, and bipolar transistors.

12. The switching regulator according to claim 7, further comprising a compensation device connected to said first control circuit, in an event of a control deviation of said first control circuit, said compensation device generating a compensation signal derived from the control deviation, the compensation signal is superposed on the control signal derived from the load current and is coupled into said second control circuit as a controlled variable.

13. The switching regulator according to claim 12, wherein control of said compensation device is affected sluggishly, said first control circuit having an integrating element being provided as an inertia-determining element.

14. In a switched-mode power supply, comprising:
a current-mode switching regulator containing:
a first terminal having a first supply potential;
a second terminal having a second supply potential;
at least one controllable semiconductor switch having a load path disposed between said first terminal and said second terminal;
an impedance connected to said load path;
a voltage divider connected in series with said impedance at a tap, at said tap an output potential can be tapped off;
an outer control loop for voltage regulation;
an inner control loop for load current regulation, said inner control loop coupled to the said outer control loop for assisting in driving said controllable semiconductor switch according to a load current and the output potential;
an integrator coupled to said impedance and receiving a voltage dropped across said impedance, said integrator integrating the voltage with respect to time resulting in a control signal mapping the load current, the control signal fed as a controlled variable to said inner control loop; and
means for adapting a gain of said integrator and having at least one transconductance whose value in a settled state is inversely proportional to the output potential.

15. The switched-mode power supply according to claim 14, wherein said current-mode switching regulator has at least one of a buck converter, a boost converter and, a flyback converter.

* * * * *